Dec. 7, 1948.  C. SADOWSKY  2,455,878
ANTISKID DEVICE FOR TIRES
Filed Aug. 7, 1946  2 Sheets-Sheet 1
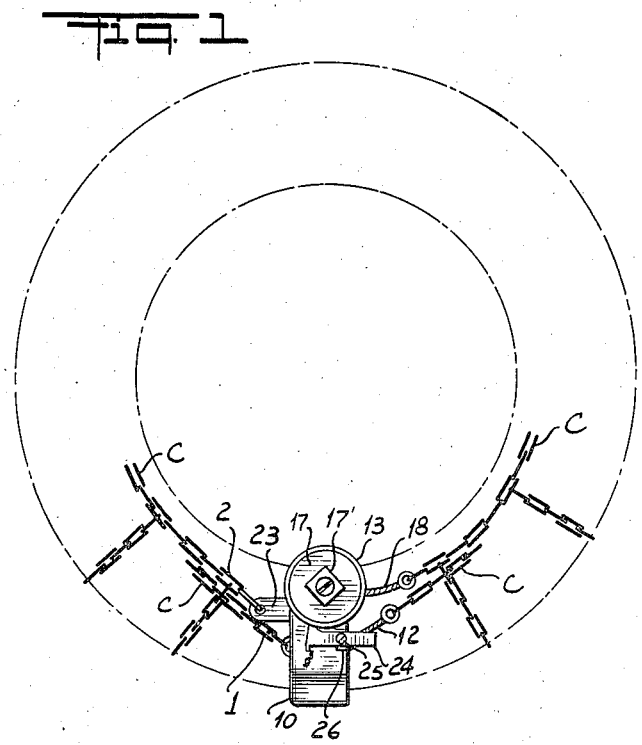
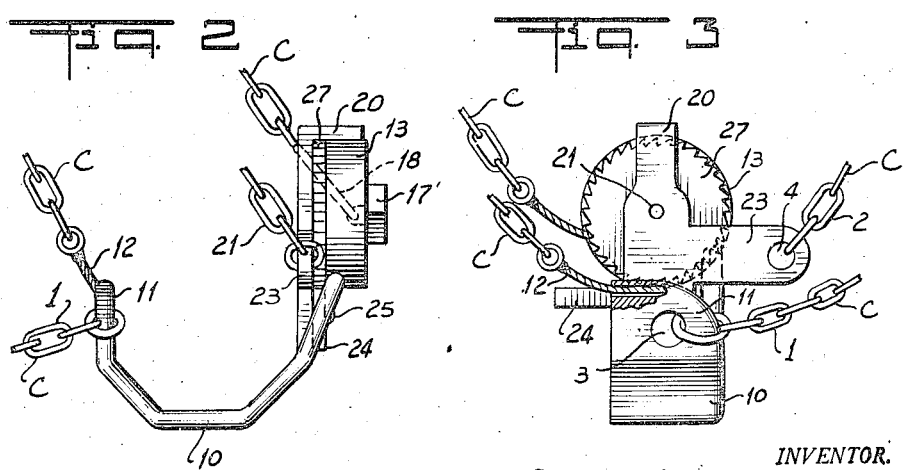
INVENTOR.
Charles Sadowsky
BY
Mock & Blum
ATTORNEYS

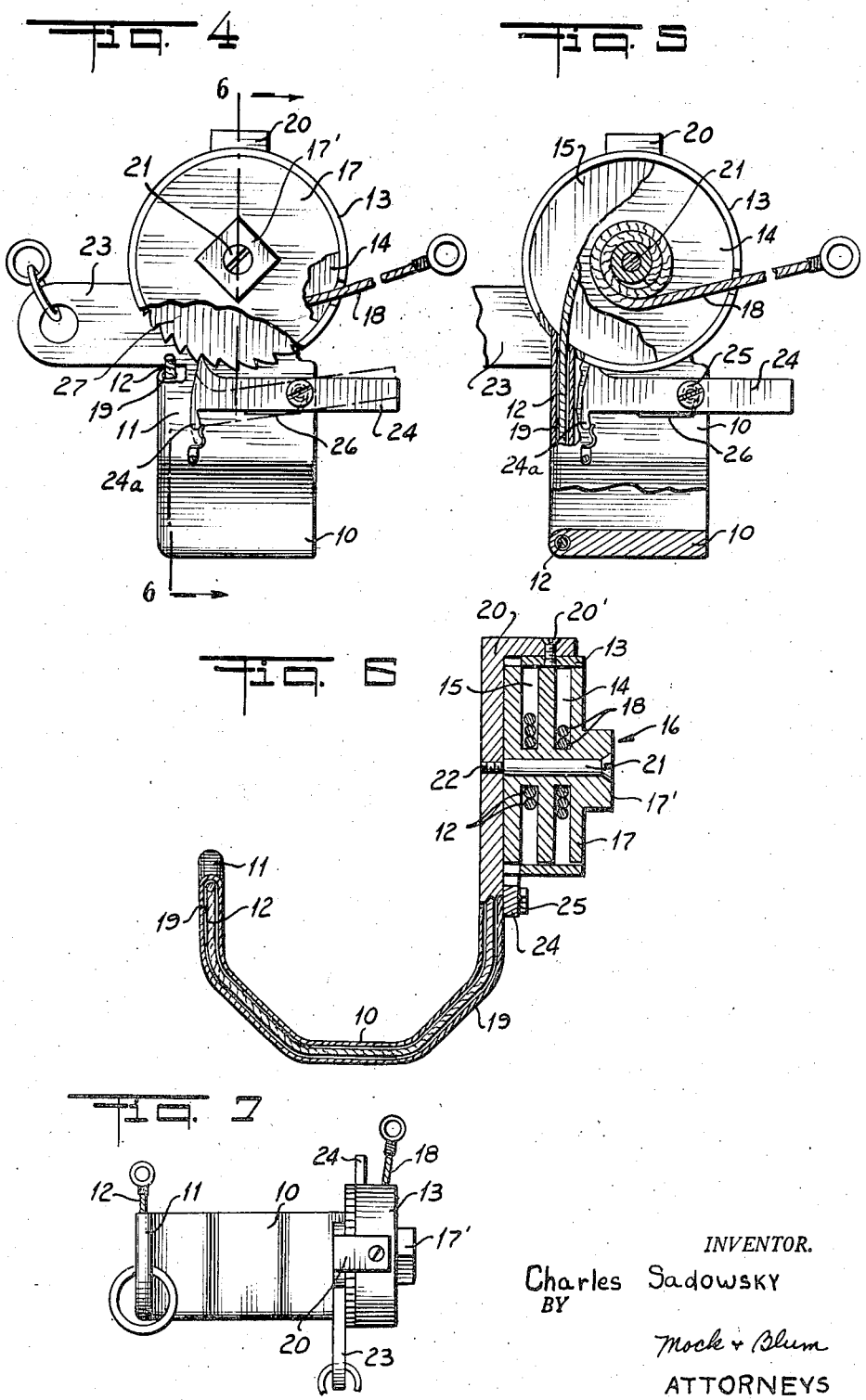

Patented Dec. 7, 1948

2,455,878

UNITED STATES PATENT OFFICE 2,455,878

ANTISKID DEVICE FOR TIRES

Charles Sadowsky, Great Neck, N. Y., assignor to United Device Corporation, New York, N. Y., a corporation of New York Application August 7, 1946, Serial No. 688,831

8 Claims. (Cl. 152—219)

This invention relates to a device for applying, tightening, and securing anti-skid chains, and more particularly to a device which may be easily applied to an automobile tire casing and may be easily tightened and removed without necessitating the raising of the wheels.

It is one object of the present invention to provide a device which permits application, tightening and removal of anti-skid chains without the necessity of reaching behind the tire during the entire operation.

Another object of this invention is to provide simple means which hold the anti-skid chains snugly on the tire and keep them in this condition, which is very important for the correct use of the chains.

Other objects and the advantages of the invention will be apparent from the following specification and claims and the appended drawings which show by way of example a preferred embodiment of the invention, and in which Figure 1 is a front view of the device according to this invention on a reduced scale;

Figure 2 is a side view, and Figure 3 is a rear view of the device shown in Figure 1;

Figure 4 is a front view, partially broken away to show the ratchet mechanism;

Figure 5 is also a front view, the disk of the drum being broken away to show the cables;

Figure 6 is a sectional view on line 6—6 of Figure 4, and

Figure 7 is a top view.

Referring now to the drawings in detail, one set of ends 1 and 2 of the main long chains C are secured to a channel shaped metal bar 10, said bar 10 being shaped to fit the contour of a standard tire. Chain end 1 is attached to hole 3 provided in upper end 11 of member 10, while chain end 2 is attached to hole 4 in the projecting tongue 23. The opposite set of ends 5 and 6 of the chains C are secured to a pair of cables 12 and 18. As shown in Figures 3 and 6, cable 12 enters a tubular section 19, which is integral with bar 10 and extends through the entire length of said bar 10. Cable 12 passes through this tubular section, then passes through the retaining ring 13, and is wound up on one side 15 of a drum 16. The other cable 18 passes directly through the ring 13 and is wound up on the other side 14 of drum 16.

As shown in the drawings, the drum 16 is pivotally connected by bolt 21 at 22 to one end of the bar 10. This end of the bar is provided with a right angle flange 20 which is secured to ring 13 by fastening means 20', as shown in Figure 6. As best shown in this figure, the drum is divided into a compartment 14, which receives cable 18, and compartment 15, which receives cable 12. The outer wall 17 of drum 16 is provided with a nut 17', and the cables may be wound up by means of a crank (not shown), which is slipped over nut 17'. The back 27 of the drum has teeth cut into its periphery and these teeth are adapted to be engaged by pawl 24, which is pivotally secured at 25 to bar 10, and is held under spring tension by spring 26. The length of the cables 12 and 18 is such as to permit, when drawn out of drum 16, slipping of the chains over the tire.

In operation, the bar 10 is placed on the ground slightly in front of the left rear tire—the unit being made reversed for the right side—and the loose cable 12 is laid close to the tire. The same is done on the right side. The car is then driven forward until the tire rests on bar 10. The chains are then slipped over the tire and spaced evenly. Then the nut 17 is engaged with a crank and rotated, thereby making the chains 1 and 2 taut. The chains are held in this condition by the action of pawl 24.

When it is desired to remove the chains, the car is brought to rest with bar 10 in contact with the ground. The pawl 24 is released and the cross link of chains between chains 1 and 2 is grabbed and pulled toward the rear of the car, thus extending the cables to their full length. The chains can then be slipped over the tires and the car driven back over the cables.

As shown by the above description, it is not necessary to reach behind the tire during the whole operation, as all work is performed in front. Furthermore, it is easy to make and keep the chains taut in the above described manner by means of the device embodying my invention.

It will be apparent from the above description and drawings that the present invention is not limited to the details described above and illustrated in the drawings, and may be carried out with various modifications without departing from the spirit and scope of the invention as defined in the appended claims.

What is claimed is:

1. An anti-skid device for tires, comprising, in combination with anti-skid chains, a channel-shaped member fitting the contour of the tire, said member being securably attached at one end thereof to tensioning means, said tensioning means being provided with two cables, one end of each said cables being attached to a free end of said anti-skid chains.

2. An anti-skid device for tires comprising, in combination with anti-skid chains, a channel-shaped bar fitting the contour of the tire, a drum having a rear supporting member securably attached to one end of said bar, said drum being adapted to receive and wind up two cables, said cables being attached at one end to said anti-skid chains, the other ends of said chains being fastened to the channel-shaped bar and the rear supporting member of said drum respectively.

3. An anti-skid device for tires, comprising, in combination with anti-skid chains, a channel-shaped bar fitting the contour of the tire, a drum having a rear supporting member securably attached to one end of said bar, said drum being adapted to receive and wind up two cables in separate compartments thereof, said cables being attached at one end to said anti-skid chains, the other ends of said chains being fastened to the channel-shaped bar and the rear supporting member of said drum respectively.

4. An anti-skid device for tires comprising in combination with anti-skid chains, a channel-shaped bar fitting the contour of the tire, a drum having a rear supporting member securably attached to one end of said bar, said drum being provided with a ratchet mechanism and being adapted to receive and wind up two cables in separate compartments thereof, said cables being attached at one end to said anti-skid chains, the other ends of said chains being fastened to the channel-shaped bar and the rear supporting member of said drum respectively.

5. An anti-skid device for tires as described in claim 4, said channel-shaped bar being provided with an integral tubular section which extends through the entire length of the bar and through which one of the cables is passed.

6. In an anti-skid device for tires of the character described, an anti-skid chain tightening and locking means, comprising a U-shaped bar, a drum having a rear supporting wall secured to one end of said bar, said drum being adapted to receive and wind up two cables connected with a pair of ends of long anti-skid chains, the other pair of ends of said chains being connected to said U-shaped bar and said rear supporting wall respectively.

7. In an anti-skid device for tires of the character described, an anti-skid chain tightening and locking device, comprising a U-shaped bar, a two-compartment drum having a rear supporting wall connected to one end of said bar, said drum being adapted to receive and wind up in said two compartments thereof two cables connected with a pair of ends of long anti-skid chains, the other pair of ends of said chains being connected to said U-shaped bar and said rear supporting wall respectively, said U-shaped bar being provided with an integral tubular section extending through the entire length thereof, one of the cables passing therethrough.

8. In an anti-skid device of the character described, an anti-skid chain tightening and locking device, comprising a U-shaped bar, a two-compartment drum having a rear supporting wall connected to one end of said bar, said drum being adapted to receive and wind up in said two compartments thereof two cables connected with a pair of ends of long anti-skid chains, the other pair of ends of said chains being connected to said U-shaped bar and said rear supporting wall respectively, said bar being provided with an integral tubular section extending through the entire length of the bar, one of the cables passing therethrough, said drum being provided with a ratchet mechanism adapted to hold the drum in a fixed position.

CHARLES SADOWSKY.

REFERENCES CITED

The following references are of record in the file of this patent:

UNITED STATES PATENTS

| Number | Name | Date |
| --- | --- | --- |
| 380,150 | Vandecar | Mar. 27, 1888 |
| 714,528 | Sprague | Nov. 25, 1902 |
| 2,423,759 | Edwards | July 8, 1947 |